(12) United States Patent
Halvis et al.

(10) Patent No.: US 7,468,504 B2
(45) Date of Patent: Dec. 23, 2008

(54) SPECTRAL FILTER FOR OPTICAL SENSOR

(75) Inventors: James Halvis, Severna Park, MD (US);
Richard Calve McKee, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/370,846

(22) Filed: Mar. 9, 2006

(65) Prior Publication Data

US 2007/0210244 A1    Sep. 13, 2007

(51) Int. Cl.
*G01J 3/50* (2006.01)
*H01J 5/16* (2006.01)
*H01J 40/14* (2006.01)

(52) U.S. Cl. .................. 250/226; 348/267; 348/277

(58) Field of Classification Search ............. 250/208.1, 250/226, 339.05; 348/267, 277
See application file for complete search history.

(56) References Cited

U.S. PATENT DOCUMENTS

| | | | |
|---|---|---|---|
| 4,675,532 A | 6/1987 | Carson | |
| 4,876,453 A * | 10/1989 | Wirick | ......... 250/332 |
| 4,996,427 A | 2/1991 | Noble et al. | |
| 5,258,618 A | 11/1993 | Noble | |
| 5,402,171 A | 3/1995 | Tagami et al. | |
| 5,585,622 A | 12/1996 | Durst et al. | |
| 5,663,825 A | 9/1997 | Amon et al. | |
| 5,724,152 A * | 3/1998 | Hayashi et al. | ............. 358/296 |
| 5,925,880 A | 7/1999 | Young et al. | |
| 6,075,235 A | 6/2000 | Chun | |
| 6,469,304 B2 * | 10/2002 | Hewitt et al. | ................. 250/347 |
| 6,473,122 B1 | 10/2002 | Kanekal | |
| 6,555,854 B2 * | 4/2003 | Huang et al. | ................. 257/222 |
| 6,657,663 B2 * | 12/2003 | Morris | ....................... 348/273 |
| 2003/0178549 A1 | 9/2003 | Ray | |
| 2004/0211901 A1 | 10/2004 | Syllaios et al. | |
| 2006/0017829 A1 * | 1/2006 | Gallagher | ................... 348/276 |

OTHER PUBLICATIONS

National Aeronautics and Space Administration, Landsat Project Science Office. Landsat 7 Science Data User's Handbook, Chapter 3—Landsat 7 Payload [online]. Jun. 1, 2005 [retrieved Jun. 13, 2007]. Retrieved from the Internet: <URL: http://landsathandbook.gsfc.nasa.gov/handbook/handbook_htmls/chapter3/chapter3.html>.*

(Continued)

*Primary Examiner*—Seung C Sohn
(74) *Attorney, Agent, or Firm*—Rothwell, Figg, Ernst & Manbeck, P.C.

(57) ABSTRACT

The present invention provides a spectral filter for an optical sensor. The spectral filter includes a substrate having a focus region and a defocus region, a panchromatic filter region disposed on the focus region of the substrate and a multi-spectral filter region disposed on the defocus region of the substrate. The panchromatic filter region includes a plurality of panchromatic pixels, while the multi-spectral filter region includes a plurality of multi-spectral pixels. Each of the multi-spectral pixels includes a plurality of color pixels.

8 Claims, 3 Drawing Sheets

OTHER PUBLICATIONS

National Aeronautics and Space Administration, Landsat Project Science Office. Landsat 7 Science Data User's Handbook, ETM+ Instrument [online]. May 6, 1999 [retrieved Jun. 13, 2007]. Retrieved from the Internet: <URL: http://landsathandbook.gsfc.nasa.gov/handbook/handbook_htmls/chapter3/htmls/ETM_cutout.html>.*

National Aeronautics and Space Administration, Landsat Project Science Office. Landsat 7 Science Data User's Handbook, ETM+ Scan Mirror Assembly [online]. Jul. 13, 1998 [retrieved Jun. 13, 2007]. Retrieved from the Internet: <URL: http://landsathandbook.gsfc.nasa.gov/handbook/handbook_htmls/chapter3/htmls/sma.html>.*

National Aeronautics and Space Administration, Landsat Project Science Office. Landsat 7 Science Data User's Handbook, ETM+ Primary Focal Plane Assembly [online]. Feb. 21, 2002 [retrieved Jun. 13, 2007]. Retrieved from the Internet <URL: http://landsathandbook.gsfc.nasa.gov/handbook/handbook_htmls/chapter3/htmls/pfp.html>.*

National Aeronautics and Space Administration, Landsat Project Science Office. Landsat 7 Science Data User's Handbook, ETM+ Cold Focal Plane Assembly [online]. Feb. 21, 2002 [retrieved Jun. 13, 2007]. Retrieved from the Internet: <URL: http://landsathandbook.gsfc.nasa.gov/handbook/handbook_htmls/chapter3/htmls/cfp.html>.*

National Aeronautics and Space Administration, Landsat Project Science Office. Landsat 7 Science Data User's Handbook, ETM+ Spectral Filters [online]. Aug. 4, 1998 [retrieved Jun. 13, 2007]. Retrieved from the Internet: <URL: http://landsathandbook.gsfc.nasa.gov/handbook/handbook_htmls/chapter3/htmls/filters.html>.*

* cited by examiner

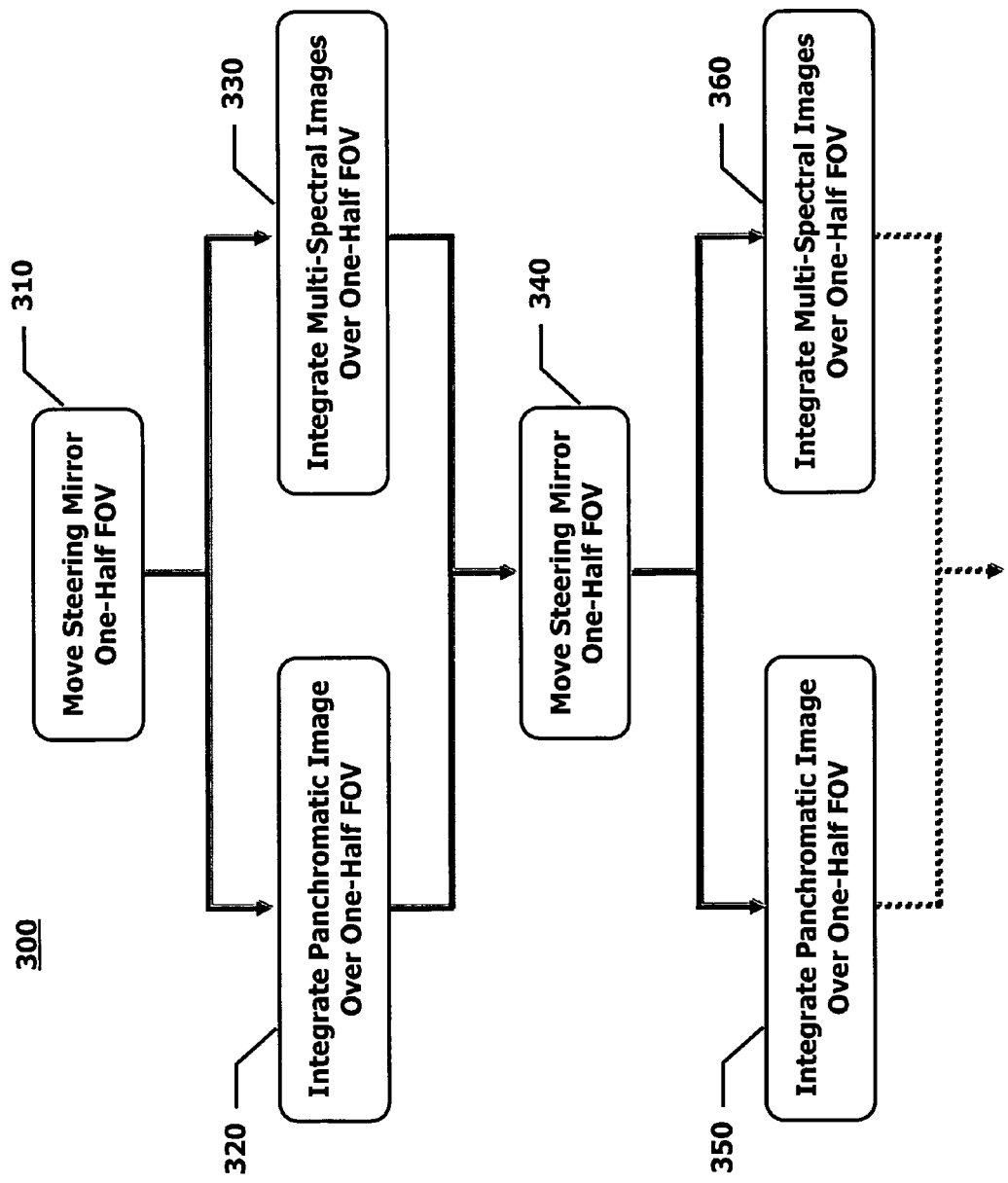

SPECTRAL FILTER FOR OPTICAL SENSOR

FIELD OF THE INVENTION

The present invention relates to optical imaging. More particularly, the present invention relates to a spectral filter for an optical sensor.

BACKGROUND OF THE INVENTION

Future spaceborne step and staring imaging systems will likely incorporate recent advances in both visible and infrared staring array technology. These advances include higher operating temperatures, improved signal to noise performance, lower power, larger pixel count (array format) and highly-integrated control and signal processing functions. For many applications, both higher-resolution panchromatic and lower-resolution multi-spectral imagery are desired. However, because of many considerations, including, for example, cost, size, weight, power, etc., separate panchromatic and multi-spectral optical sensors are generally not practical for spaceborne imaging systems.

In order to acquire optical imagery across different spectral bands using a single optical sensor, high-speed, mechanical filter-switching mechanisms have been proposed to move different spectral filters into, and out of, the optical path of a large format staring array. For example, a wide-band panchromatic filter may be moved into the optical path of the array and panchromatic data may be acquired after the optical signal has been integrated over a certain period of time. The panchromatic filter may then be moved out of the optical path, one or more narrow-band spectral filters may be sequentially moved into the optical path, the optical signal may be integrated and the narrow-band spectral data acquired. This multi-spectral data may be acquired at the same, or lower, resolution as the panchromatic data.

There are several disadvantages to this mechanically-switched approach, including, for example, the reliability of the mechanism, the disturbances imparted to the satellite due to the motion of the various components of the mechanism, as well as the size, weight, power, cost, etc., of the device. One of the most critical disadvantages of this approach is the time required to sequentially switch the spectral filters, integrate the optical signal, acquire and then transfer the higher-resolution data to the host satellite's telemetry system. These data include a large number multi-spectral pixels, which not only increase processing and data transfer loads, but also complicate pixel calibration. These critical disadvantages constrain the overall image gathering capability of the satellite, and may necessitate the deployment of additional satellites in order to provide sufficient coverage.

Thus, there is a need for a spectral filter that permits an imaging array to acquire both wide and narrow band imagery without the disadvantages attendant with a mechanical, filter-switching mechanism.

SUMMARY OF THE INVENTION

Embodiments of the present invention provide a spectral filter for an optical sensor. The spectral filter includes a substrate having a focus region and a defocus region, a panchromatic filter region disposed on the focus region of the substrate and a multi-spectral filter region disposed on the defocus region of the substrate. The panchromatic filter region includes a plurality of panchromatic pixels, while the multi-spectral filter region includes a plurality of multi-spectral pixels. Each of the multi-spectral pixels includes a plurality of color pixels.

BRIEF DESCRIPTION OF THE DRAWINGS

The above and other advantages of this invention will become more apparent by the following description of invention and the accompanying drawings.

FIG. 3 is a flowchart depicting a method for simultaneously acquiring panchromatic and multi-spectral images in accordance with an embodiment of the present invention.

DETAILED DESCRIPTION

Figure 1:
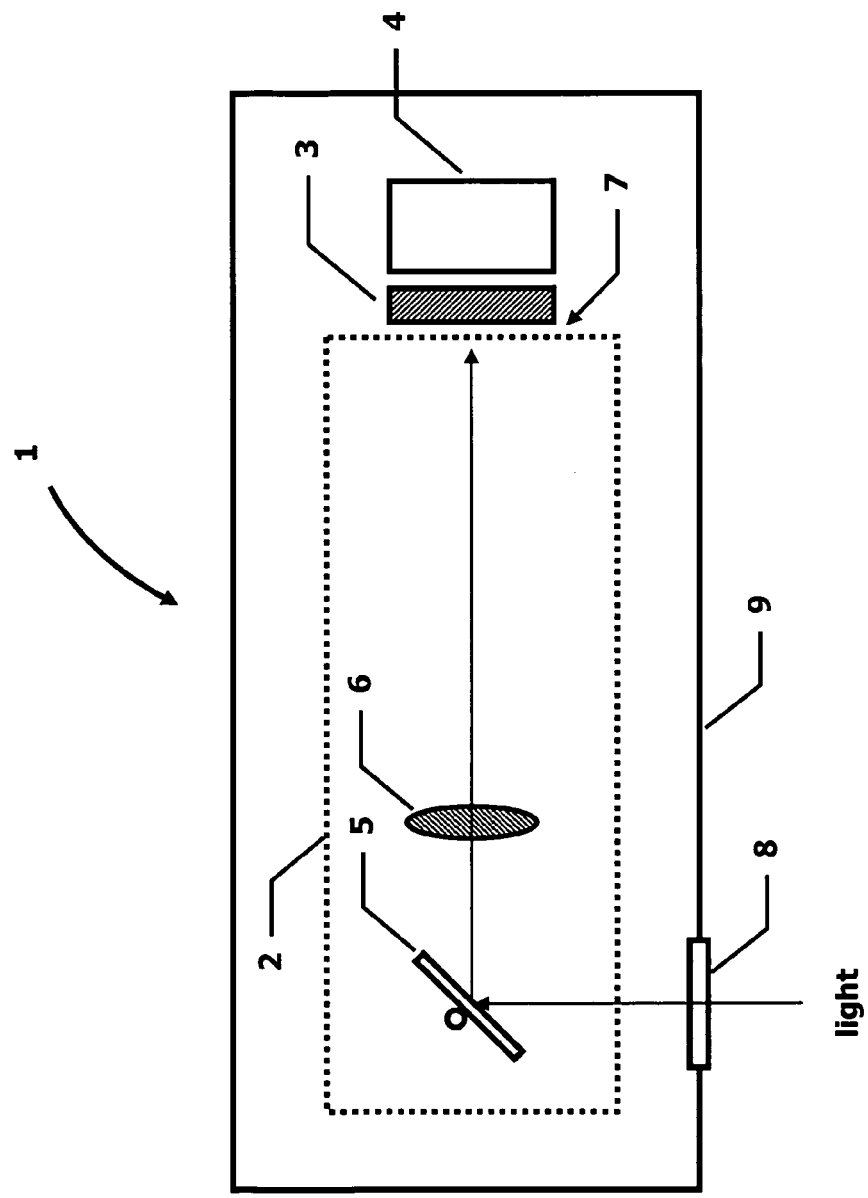
FIG. 1 is a schematic diagram depicting an optical sensor in accordance with an embodiment of the present invention.

FIG. 1 is a schematic diagram depicting an optical sensor, for narrow field-of-view applications, in accordance with an embodiment of the present invention. Generally, optical sensor 1 includes an optics assembly 2, such as, for example, a telescope, an imaging array 3 and an electronics package 4. Optics assembly 2 includes at least one fast steering mirror 5 and at least one lens 6 to capture and focus light onto at least one focal plane 7. Additional mirrors and lenses, as well as other components, such as shutters, filters, etc., may also be included. Imaging array 3 is typically disposed at the focal plane 7 of optics assembly 2. Electronics package 4 provides power to, and controls, the various components of optics assembly 2 (as required), acquires data from imaging array 3 and generally communicates with the host spacecraft (not shown). Optics assembly 2, imaging array 3 and electronics package 4 may be located within a housing 9, which includes an aperture 8 through which light passes. Optical sensor 1 may also be hosted by an airborne platform. For wide field-of-view applications, a fast steering mirror may be located aft of the primary optics.

Figure 2:
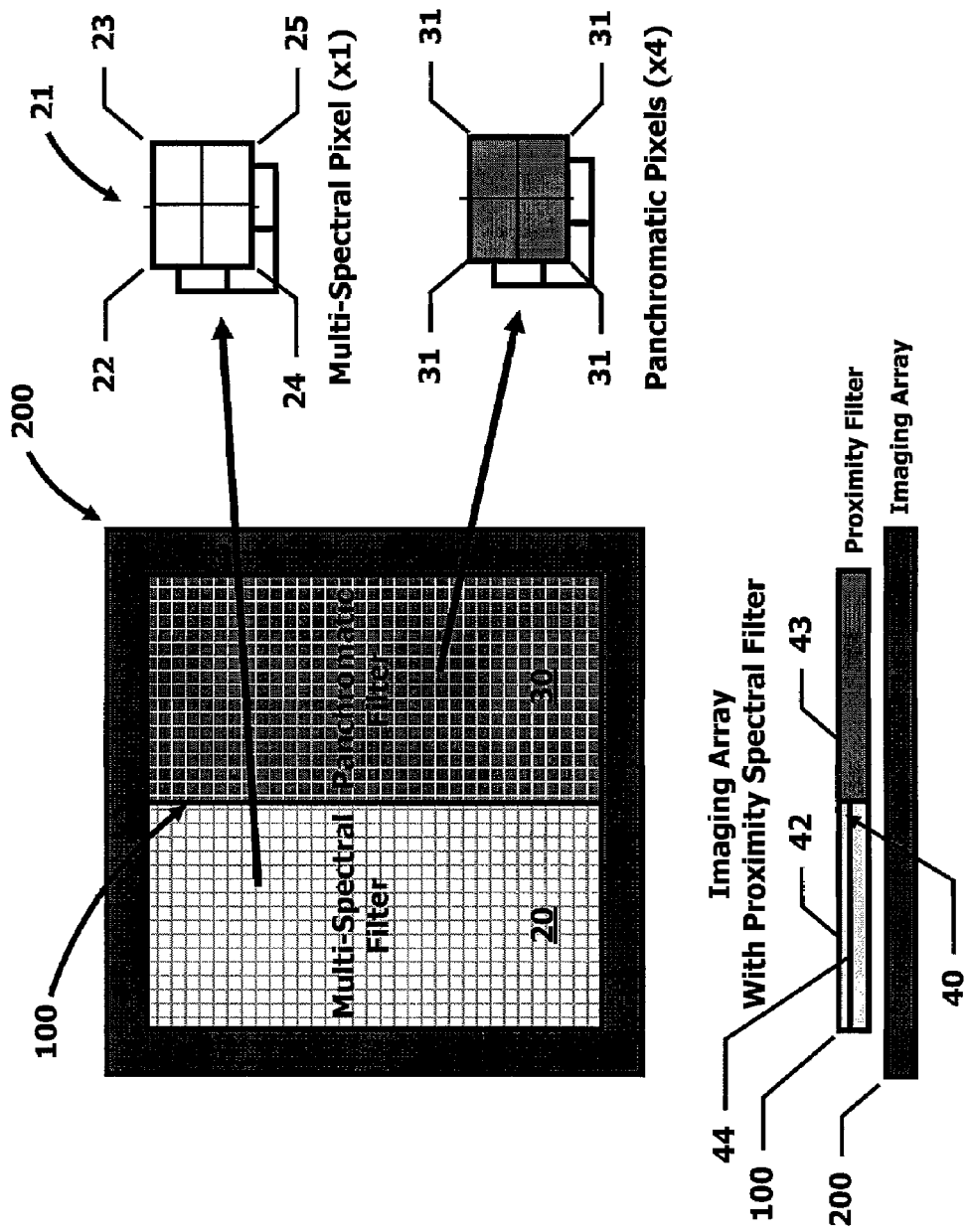
FIG. 2 is a schematic diagram depicting a spectral filter in accordance with an embodiment of the present invention.

FIG. 2 is a schematic diagram depicting a spectral filter in accordance with an embodiment of the present invention. Generally, spectral filter 100 is arranged within an optical sensor in order to filter the light incident upon an imaging array, such as, for example, a large format staring array. In a preferred embodiment, spectral filter 100 and imaging array 200 are disposed at the focal plane 7 of optical sensor 1. Spectral filter 100 includes a substrate 40 on which at least two filter regions are formed. In the depicted embodiment, spectral filter 100 includes two equally-sized filter regions, i.e., lower-resolution multi-spectral filter region 20 and a higher-resolution panchromatic filter region 30. In other embodiments, one or more multi-spectral filter regions 20 may be combined with one or more panchromatic filter regions 30 to form other configurations of spectral filter 100.

Panchromatic filter region 30 filters the light to provide a panchromatic (i.e., broad wavelength range) spectrum to one portion of the array, which then captures the panchromatic image, such as, for example, a black-and-white image in which all visible light is present. Blue wavelengths may be optionally suppressed by panchromatic filter region 30 in order to reduce the scattering effects that occurs therein. Multi-spectral filter region 20 filters the light to simultaneously provide relatively narrow wavelength range spectra to another portion of the array, which then captures a multi-spectral image, i.e., a composite image including each narrow spectral band, as discussed in more detail below.

In a preferred embodiment, the two-dimensional panchromatic filter region 30 is populated with uniformly sized, uniformly spaced panchromatic pixels 31. The number and pitch of panchromatic pixels 31 is determined by various factors, such as, for example, the panchromatic image resolution requirements, optical assembly focal length and focal ratio, satellite altitude, imaging array parameters, etc. For example, at an altitude of approximately 700 km and a focal length and focal ratio of 10 m and f14.3, respectively, a one-meter panchromatic image resolution is supported by a $12 \times 10^{-6}$ m panchromatic pixel pitch.

In one embodiment, panchromatic pixels 31 may be designed to pass a wide range of wavelengths, such as, for example, 480-830 nm. Panchromatic pixels 31 may be composed of thin layers of optically transparent materials deposited in precise thicknesses to provide optical interference and reflection of out-of-band wavelengths. Standard fabrication techniques may be used for panchromatic pixels 31. For example, thin layers of optically transparent materials may be sequentially deposited by evaporation or sputtering of the materials.

In the preferred embodiment, the two-dimensional multi-spectral filter region 20 is populated with uniformly sized, uniformly spaced multi-spectral pixels 21. Generally, the size of each multi-spectral pixel 21 is an integer multiple of the size of a panchromatic pixel 31. For example, in one embodiment, each multi-spectral pixel 21 consists of four, equally-sized and symmetrically-arranged color pixels 22, 23, 24 and 25, each the same size as a single panchromatic pixel 31. In this embodiment, the size of a multi-spectral pixel 21 is therefore four times greater than the size of a panchromatic pixel 31. In other words, a single multi-spectural pixel 21 occupies the same area as a "2×2" array of panchromatic pixels 31. And, assuming a one meter panchromatic image resolution, the multi-spectral image resolution for this embodiment would be four meters, with a multi-spectral pixel pitch of 48×10-6 m.

Similarly, in other embodiments, the size of a single multi-spectral pixel 21 may be nine times as great as the size of a panchromatic pixel 31 (i.e., a "3×3" array), 16 times as great as the size of a panchromatic pixel 31 (i.e., a "4×4" array), 25 times as great as the size of a panchromatic pixel 31 (a "5×5" array), etc.

In the "2×2" array embodiment, each color pixel may be designed to pass a different range of wavelengths to imaging array 200. For example, color pixels 22, 23, 24 and 25 may pass 430-550 nm (blue), 490-610 nm (green), 600-720 nm (red) and 750-950 nm (NIR), respectively. Thus, in this example, the four color pixels 22, 23, 24 and 25 may be referred to as the blue, green, red and NIR pixels.

In one embodiment, multi-spectral pixels 21 may be composed of thin layers of optically transparent materials deposited in precise thicknesses to provide optical interference and reflection of out-of-band wavelengths. Standard fabrication techniques may also be used for multi-spectral pixels 21. For example, thin layers of optically transparent materials may be sequentially deposited by evaporation or sputtering of the materials.

In the preferred embodiment, imaging array 200 is a large format staring array. Typical detector materials include, for example, Silicon, InGaAs, InSb, HgCdTe, etc. In one embodiment, an array of Silicon PIN diodes is hybridized to a Silicon readout circuit using Indium bump bonding. The pitch of the array pixels matches the panchromatic pixel pitch, such as, for example, $12 \times 10^{-6}$ m, and the array may include millions of pixels, such as, for example, 25 million pixels arranged in 5,000 horizontal×5,000 vertical pixel format.

In operation, an optical sensor incorporating embodiments of the present invention simultaneously acquires both a higher-resolution panchromatic image and a lower-resolution multi-spectral image during each sampling period. For an embodiment of spectral filter 100 having equally-sized multi-spectral and panchromatic filter regions 20 and 30, respectively, one half of the field-of-view is imaged by array 200 in higher-resolution panchromatic format, while the other half of the field-of-view is simultaneously imaged by array 200 in lower-resolution multi-spectral format. After the optical signal is integrated by array 200, fast steering mirror 5 moves one half of the field of view and the next pair of panchromatic and multi-spectral images are acquired by array 200.

Advantageously, the complete field-of-view is imaged by array 200 after only two move-and-integrate operations. For simplicity, these may be described as: (1) move the steering mirror one half of the field-of-view and integrate each of the panchromatic and multi-spectral images over one half of the field-of-view, and (2) move the steering mirror one half of the field-of-view and integrate each of the panchromatic and multi-spectral image over one half of the field-of-view. Accordingly, while the resulting image of the complete field-of-view has been spatially-sampled, color pixel data has been acquired simultaneously for each multi-spectral pixel 21.

Conversely, for the mechanical, color filter-switching mechanism described above, many operations are needed to acquire both a panchromatic image and a multi-spectral image over the complete field-of-view. For example, these may be described as: (1) move the steering mirror the complete field-of-view, move the panchromatic filter into the optical path and integrate the panchromatic image over the complete field-of-view, (2) move the panchromatic filter out of, and the blue filter into, the optical path and integrate the blue component of the multi-spectral image over the complete field-of-view, (3) move the blue filter out of, and the green filter into, the optical path and integrate the green component of the multi-spectral image over the complete field-of-view, (4) move the green filter out of, and the red filter into, the optical path and integrate the red component of the multi-spectral image over the complete field-of-view and (5) move the red filter out of, and the NIR filter into, the optical path and integrate the NIR component of the multi-spectral image over the complete field-of-view. While each component of the multi-spectral image is imaged at the full resolution of array 200, the pixel data acquired for each color filter is typically aggregated for readout and data processing, resulting in a lower-resolution multi-spectral image having a higher signal-to-noise ratio.

Equal ground areas are imaged by both approaches. However, assuming that the time required to move steering mirror 5 is comparable to the time required to switch each color filter, the mechanical, color filter-switching mechanism requires considerably more time to capture a complete field-of-view image. Thus, embodiments of the present invention may advantageously provide improved overall satellite coverage.

FIG. 3 is a flowchart depicting a method (300) for simultaneously acquiring panchromatic and multi-spectral images in accordance with an embodiment of the present invention. The steering mirror is moved (310) one half of the field-of-view and the panchromatic and multi-spectral images are each integrated (320, 330, respectively) over one half of the field-of-view. In this embodiment, spectral filter 100 includes two equally-sized filter regions, i.e., lower-resolution multi-spectral filter region 20 and a higher-resolution panchromatic filter region 30. Accordingly, for each acquisition period, one half of array 200 integrates the panchromatic image, while the other half of array 200 integrates the multi-spectral images. The steering mirror is then moved (340) one half of the field-of-view and the panchromatic and multi-spectral images are integrated (350, 360) over one half of the field-of-view. Thus, both panchromatic and multi-spectral images of the same area on the ground are acquired.

In a preferred embodiment, the integration times for the panchromatic and multi-spectral images may be the same, such as, for example, several milliseconds. In other embodiments, however, the panchromatic and multi-spectral image integration times may differ. For example, the panchromatic image integration time may be different than the multi-spectral image integration time, at least one multi-spectral band integration time may be different than the other multi-spectral band integration times, each multi-spectral band integration time may be different, etc.

The multi-spectral pixel 21 of the present invention, however, may be undersampled both spatially and spectrally. Spatial undersampling may be mitigated, for example, by increasing the integration time for each image, thus increasing the signal to noise ratio. Advantageously, panchromatic image performance will simultaneously improve. Spectral undersampling may be mitigated, for example, by optically averaging the light signal prior to multi-spectral filtering.

In a preferred embodiment, optical averaging is accomplished by defocusing the image prior to multi-spectral filter region 20. However, it is important that the image remains focused for panchromatic filter region 30. Accordingly, substrate 40 may include a focus region 43 and a defocus region 42 adjoining the panchromatic filter region 30 and the multi-spectral filter region 20, respectively. One embodiment of the present invention defocuses the image by using a thicker substrate thicknesses within the defocus region 42 than the focus region 43. Another embodiment of the present invention defocuses the image by using a different substrate material within the defocus region 42 than the focus region 43. In an alternative embodiment, optical averaging is accomplished by diffusing the image prior to multi-spectral filter region 20. Accordingly, a diffusing layer 44 may be incorporated within the defocus region 42. Defocusing assures that the sub-sampling approach is valid.

Focus is determined by the effective focal length of the optical system. However, the actual focal length is determined by taking into account the index of refraction of any transparent substrates in the optical path. For example, a glass plate with index of refraction of 1.40 and a thickness of 10 mm will have an effective thickness of 1.40×10 mm=14 mm. Thus a plate can be used to focus or defocus the image onto the focal plane. By using two plate thicknesses or materials with different index of refractions in close proximity to the focal plane a portion of the focal plane may be in focus while a portion of the focal plane is out of focus.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. An optical sensor, comprising:
    an optical assembly having at least one steering mirror, at least one lens and at least one focal plane;
    an imaging array disposed at the focal plane; and
    a spectral filter, proximate to the imaging array, including:
    a panchromatic filter region having a plurality of panchromatic pixels and a panchromatic resolution; and
    a multi-spectral filter region having a plurality of multi-spectral pixels and a multi-spectral resolution less than the panchromatic resolution, each of said multi-spectral pixels having a plurality of color pixels,
    wherein the panchromatic pixels are uniformly sized, the multi-spectral pixels are uniformly sized, the panchromatic resolution is an integer multiple of the multi-spectral resolution and each multi-spectral pixel includes four uniformly-sized color pixels responsive to the blue, green, red and near infrared spectral bands, respectively, the color pixel size being the same as the panchromatic pixel size.

2. The optical sensor of claim 1,
    wherein the panchromatic filter region is disposed on a focus region of a substrate and the multi-spectral filter region is disposed on a defocus region of the substrate.

3. The optical sensor of claim 2, wherein the focus region and the defocus region have different thicknesses.

4. The optical sensor of claim 2, wherein the focus region and the defocus region are different materials.

5. The optical sensor of claim 2, wherein the defocus region includes a diffusing layer.

6. A method for simultaneously acquiring overlaid panchromatic and multi-spectral images over the complete field-of-view of an optical sensor including a steering mirror, an imaging array and a spectral filter having a panchromatic filter region and a multi-spectral filter region, the method comprising:
    moving the steering mirror one-half of the field-of-view;
    integrating a panchromatic image, acquired through the panchromatic filter region by the imaging array, over one-half of the field-of-view;
    integrating a multi-spectral image, acquired through the multi-spectral filter region by the imaging array, over one-half of the field-of-view;
    moving the steering mirror one-half of the field-of-view;
    integrating a panchromatic image, acquired through the panchromatic filter region by the imaging array, over one-half of the field-of-view; and
    integrating a multi-spectral image, acquired through the multi-spectral filter region by the imaging array, over one-half of the field-of-view.

7. The method according to claim 6, wherein a panchromatic integration time and a multi-spectral integration time are different.

8. The method according to claim 6, wherein the multi-spectral image includes a plurality of multi-spectral bands, wherein at least one multi-spectral band integration time is different than the other multi-spectral band integration times.

* * * * *